United States Patent [19]

Hashimoto et al.

[11] 3,898,893

[45] Aug. 12, 1975

[54] SPEED CHANGE CONTROLLING DEVICE IN AN AUTOMATIC TRANSMISSION FOR AN ELECTRIC CAR

[75] Inventors: Masanao Hashimoto; Kiyoshi Ohnuma, both of Toyota, Japan

[73] Assignee: Director-General of the Agency of Industrial Science and Technology, Tokyo, Japan

[22] Filed: Oct. 23, 1973

[21] Appl. No.: 408,559

[30] Foreign Application Priority Data

Oct. 23, 1972  Japan.............................. 47-105327

[52] U.S. Cl. ...................... 74/859; 74/339; 74/857; 74/866
[51] Int. Cl.² ........................................... B60K 41/08
[58] Field of Search ............ 74/857, 858, 859, 860, 74/866, 339

[56] References Cited
UNITED STATES PATENTS

| | | | |
|---|---|---|---|
| 2,803,975 | 8/1957 | Akerman et al. | 74/857 X |
| 3,417,640 | 12/1968 | Schmidt et al. | 74/866 |
| 3,545,307 | 12/1970 | Bildat | 74/858 |
| 3,645,366 | 2/1972 | Numazawa et al. | 74/860 X |
| 3,756,358 | 9/1973 | Espenschied et al. | 74/339 X |
| 3,794,133 | 2/1974 | Sagiura et al. | 74/866 X |

*Primary Examiner*—Samuel Scott
*Assistant Examiner*—John O. Reep
*Attorney, Agent, or Firm*—Stevens, Davis, Miller & Mosher

[57] ABSTRACT

The automatic transmission for electric automobiles comprises an input shaft extending from a vehicle driving motor and an output shaft connected to the input shaft via planetary gearing provided with a clutch assembly for effecting gear changes. The speed change controlling device adapted in the transmission comprises a hydraulic circuit having a change-over valve designed to switch the oil passage by connection or disconnection of power to a solenoid valve to supply pressurized, operating oil to the clutch, an electric control circuit including a transistor for changing the field current of the vehicle driving motor, a comparison circuit for comparing the field current with a reference voltage, and the rotational frequency of the motor with that of the output shaft which may or may not be multiplied by the gear ratio, an oil pressure detector device for detecting oil pressure in the clutch, a circuit for generating a pulse for changing the normal condition of the transistor, and a logic element connected between the pulse generating circuit and the solenoid valve, whereby smooth speed changing operation is effected.

3 Claims, 12 Drawing Figures

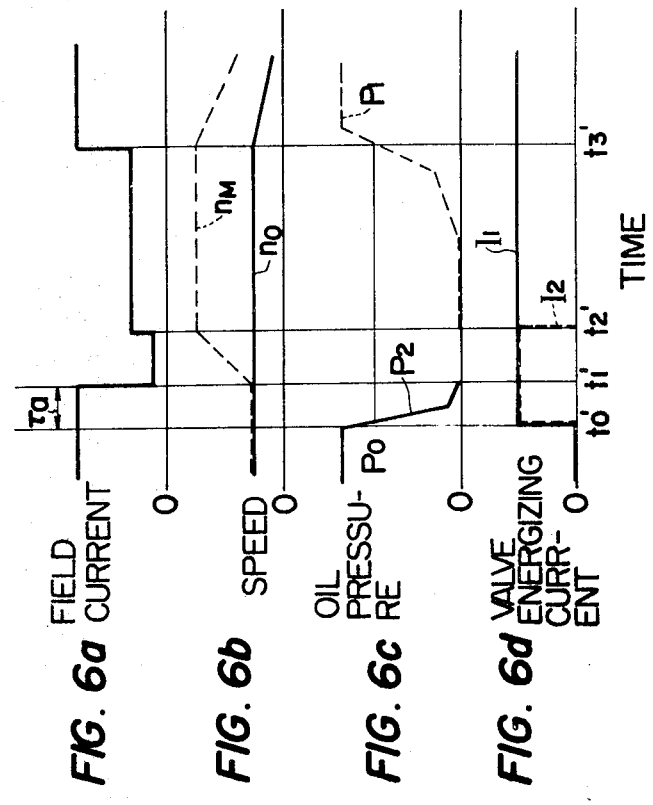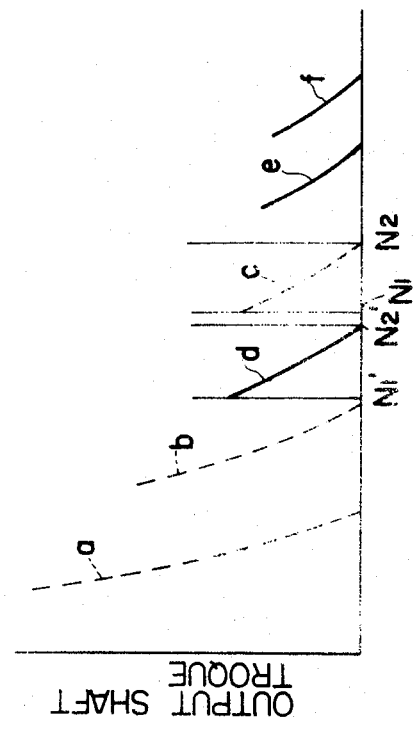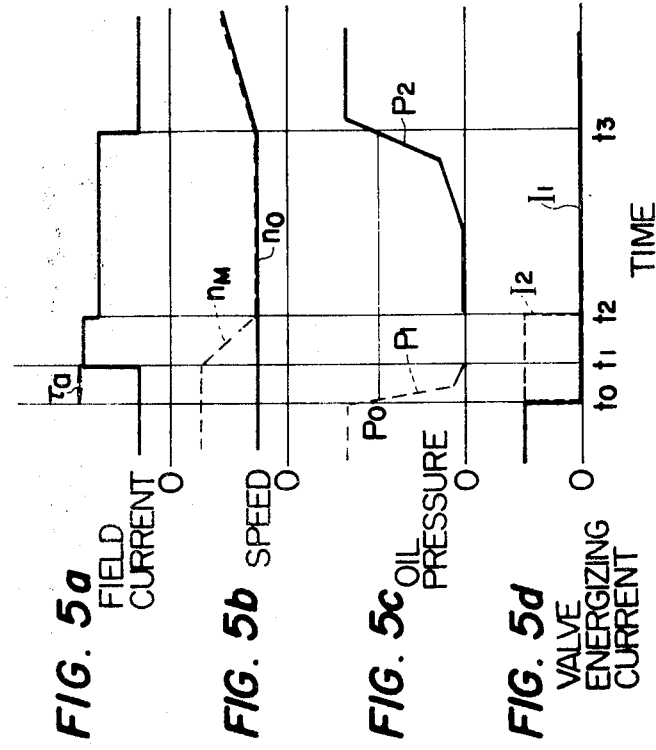

SPEED CHANGE CONTROLLING DEVICE IN AN AUTOMATIC TRANSMISSION FOR AN ELECTRIC CAR

SUMMARY OF THE INVENTION

This invention relates to a device for controlling speed change effected by an automatic transmission adapted in an electric automobile and, more particularly, to a device that allows smooth automatic speed changes without giving rise to any impulsive torque during such speed changing operations.

In order to obtain high power performance with a driving motor for electric automobiles, there have been proposed systems where the driving motor is connected to an automatic transmission provided with a clutch assembly designed to allow desired speed changes. Such systems, however, have the problem that excessive impulsive torque is produced due to a speed difference between the motor and the output shaft at the time of gear change, the time gap between the engaging and disengaging actions of the clutch, and other factors.

The present invention has been devised with the object of overcoming such problem. According to the present invention, there is provided an improved speed change controlling device whereby when a speed change is effected, the transmission is temporarily turned into the neutral position to disengage the clutch to discharge the pressurized oil therefrom while at the same time the motor speed is changed so as to synchronize with the output shaft speed. Also, such synchronized state is maintained until oil pressure in the engaged clutch is raised to a sufficient level, thereby accomplishing smooth automatic speed changing operations.

BRIEF DESCRIPTION OF THE DRAWINGS

FIG. 4 is a diagram showing the relation between the number of revolutions and torque of the transmission output shaft.

FIGS. 5 (a) to (d) are diagrams showing the characteristics of the respective parts of the speed change controlling device of the present invention as observed when the speed is shifted up from first to second speed.

FIGS. 6 (a) to (d) are diagrams showing similar characteristics as observed when the speed is shifted down from second to first speed.

DESCRIPTION OF THE PREFERRED EMBODIMENT

Figure 1:
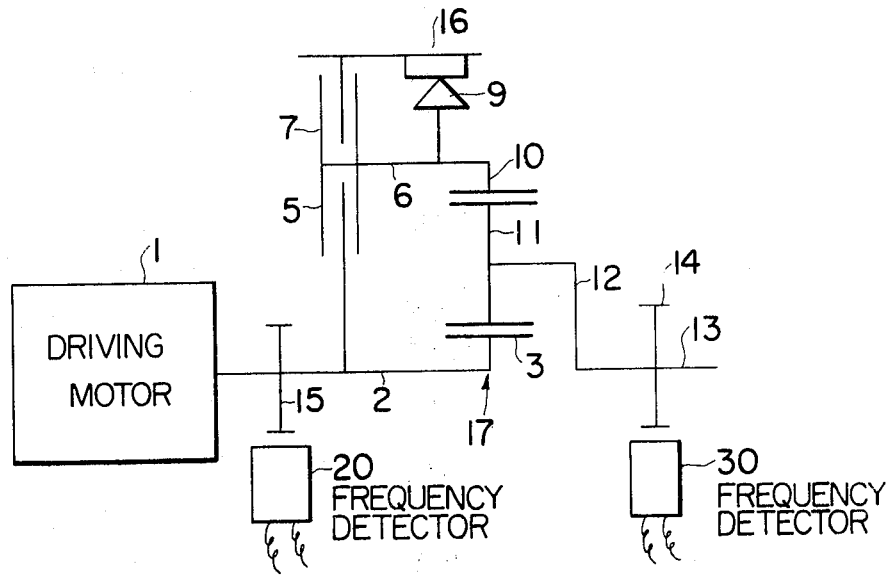
FIG. 1 is a block diagram showing a two-forward-speed automatic transmission adapted with a speed change controlling device according to the present invention.

With reference first to FIG. 1, a single-plate type direct clutch 5 is provided between an input shaft 2, connected directly to an electric automobile driving motor 1, and a rotary member 6 while a first clutch 7 and a one-way clutch 9 are provided in parallel relation between the rotary member 6 and a transmission casing 16. The input shaft 2 and rotary member 6 are connected to a sun gear 3 and a ring gear 10, respectively, which are parts of a planetary gearing 17. Both gears 3 and 10 are meshed with a pinion 11 which is rotatably supported by a carrier 12 connected to an output shaft 13 to transmit driving force. Toothed rollers 14 and 15 are provided on the output shaft 13 and the input shaft 2, respectively, to obtain a speed change control signal, which will be described later. Rotational frequency detectors 20 and 30 are provided whereby the rotational frequency of the input shaft 2 and output shaft 13 equal to that of the motor 1 are detected and converted into an analog signal.

For obtaining the first speed, the direct clutch 5 is released and the first clutch 7 or one-way clutch 9 is applied to fix the rotary member 6 as well as the ring gear 10 of the planetary gearing 17, whereby the rotative force conveyed to the input shaft 2 from the motor 1 is further transmitted through the sun gear 3 to the pinion 11 to let it revolve about itself with a reduced speed in the same direction as the direction of rotation of the input shaft 2 along the ring gear 10. This rotation is transported to the output shaft 13 via the carrier 12. In this case, when the output shaft 13 is driven by the one-way clutch 9, it is freed and does not lock the rotation of the ring gear 10, so that when the one-way clutch 9 alone is acting, the engine brake does not work. The second speed can be obtained by freeing the first clutch 7 while engaging the direct clutch 5, whereby the rotation of the input shaft 2 is also communicated to the ring gear 10 to lock the pinion 11. The output shaft 13 then is directly connected to the input shaft 2 to rotate together at same speed.

Figure 2:
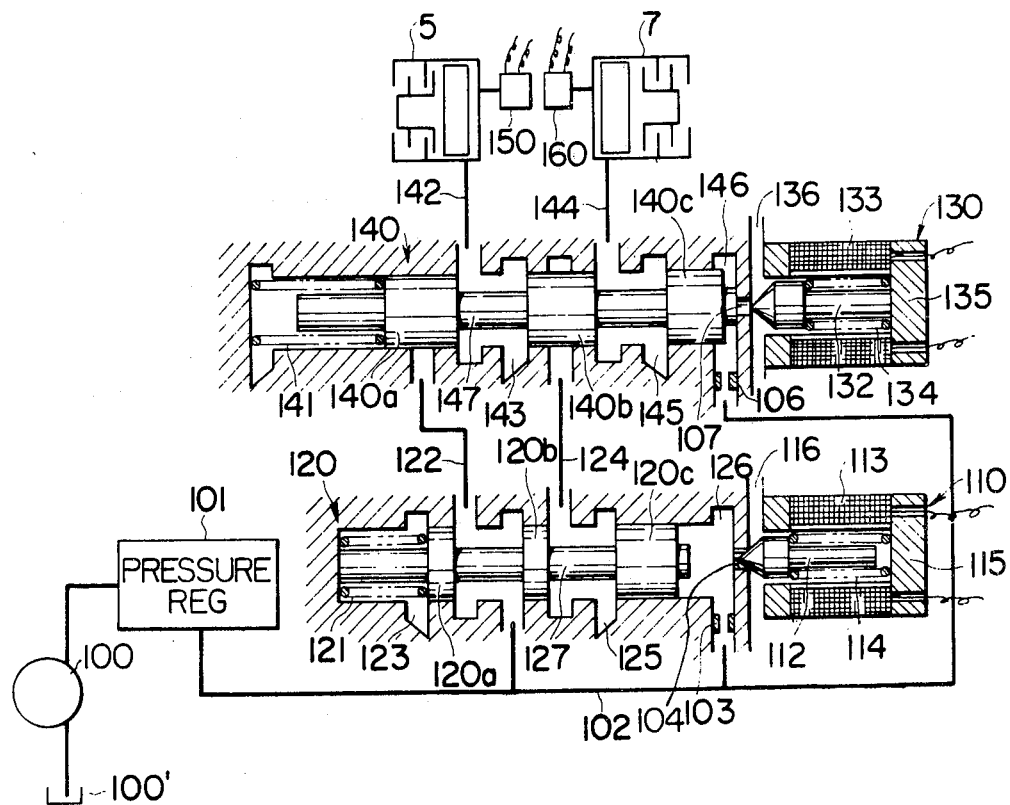
FIG. 2 is a circuit diagram showing a hydraulic circuit in the speed change controlling device of the present invention.

The hydraulic circuit controlling the operations of the above-described two clutches 5 and 7 now will be discussed with reference to FIG. 2.

Oil is pumped up from an oil reservoir 100' by an oil pump 100 and is applied to an oil passage 102 after oil pressure has been adjusted to a certain predetermined level by a pressure regulator 101. This pressurized oil in the oil passage 102 is selectively supplied to the clutches 5 and 7 by a change-over valve 120 provided with a solenoid valve 110 and a change-over valve 140 provided with another solenoid valve 130.

The change-over valve 120 has a spool 127 which is moved sideways depending on the balanced relation between the elastic force of spring 121 and the pressured oil supplied into oil chamber 126 from oil passage 102. The spool 127 has three lands 120a, 120b and 120c adapted to communicate oil passage 102 with one of the oil passages 122 and 124 while communicating the other of the oil passage 124 or 122 with pressure, discharge oil passage 123 or 125.

The solenoid valve 110 comprises a coil 113 wound around an iron core 115, a plunger 112 loaded with a spring 114 and adapted to open or close a pressure discharge port 104 provided in oil chamber 126 of change-over valve 120, and a pressure discharge oil passage 116 communicating with the port 104. When power is connected to the solenoid, pressure discharge port 104 is opened to release pressure from oil chamber 126 to let spool 127 move to the right, while when power to the solenoid is disconnected, pressure discharge port 104 is closed to accumulate oil pressure in the oil chamber 126, causing spool 127 to move to the left.

Change-over valve 140 has a spool 147 arranged to move sideways depending on the balanced relation between the elastic force of spring 141 and the pressurized oil supplied into oil chamber 146 from oil passage 102. The spool 147 is provided with three lands 140a, 140b and 140c adapted to communicate oil passages 122 and 124 with oil passages 142 and 144 to clutches 5 and 7, respectively, or to communicate the oil passages 142 and 144 with pressure discharge oil passages 143 and 145. The solenoid valve 130, as in the case of solenoid valve 110, is also arranged such that when power thereto is disconnected, plunger 132 is pushed forward by spring 134 to close pressure discharge port 107 provided in oil chamber 146 of change-over valve 140, thereby accumulating oil pressure in oil chamber 146 in order to move spool 147 to the left. When power is connected the plunger 132 is now forced backwards by the action of coil 133 wound around iron core 135, thereby communicating pressure discharge port 107 with oil passage 136 to release pressure from oil chamber 146 to cause rightward movement of spool 147.

At the inlets of oil chambers 126 and 146 are provided throttles 103 and 106 which are sufficiently smaller in diametric size than pressure discharge ports 104 and 107 to prevent reduction of oil pressure in oil passage 102. Numerals 150 and 160 refer to oil pressure detectors provided in connection with the respective clutches 5 and 7 for obtaining a speed change control signal to be described later.

Thus, in the first speed, solenoid valve 110 is energized to let spool 127 of change-over valve 120 move to the right while solenoid valve 130 is de-energized to cause leftward movement of spool 147 of change-over valve 140. Consequently, pressurized oil in oil passage 102 is once guided to oil passage 124 through lands 120a and 120b of spool 127 and then supplied to first clutch 7 through oil passage 144 and lands 140b and 140c of spool 147, while pressurized oil in direct clutch 5 is discharged from oil passage 123 through oil passages 142 and 122.

In the second speed, solenoid valve 110 is also de-energized to cause leftward movement of spool 127 of change-over valve 120, thereby communicating oil passage 102 with passage 122 and oil passage 124 with pressure discharge oil passage 125, whereby pressurized oil is supplied to direct clutch 5 while pressure to first clutch 7 is released. When solenoid valve 130 is temporarily energized with shift-up from the first to second speed or shift-down from the second to first speed, spool 147 of change-over valve 140 moves to the right to close the oil passages 122 and 124 with the lands 140a and 140b while communicating oil passages 142, 144 with pressure discharge oil passages 143, 145, with the result that pressurized oil to both clutches 5 and 7 is released to bring both clutches into the inoperative neutral position.

Figure 3:
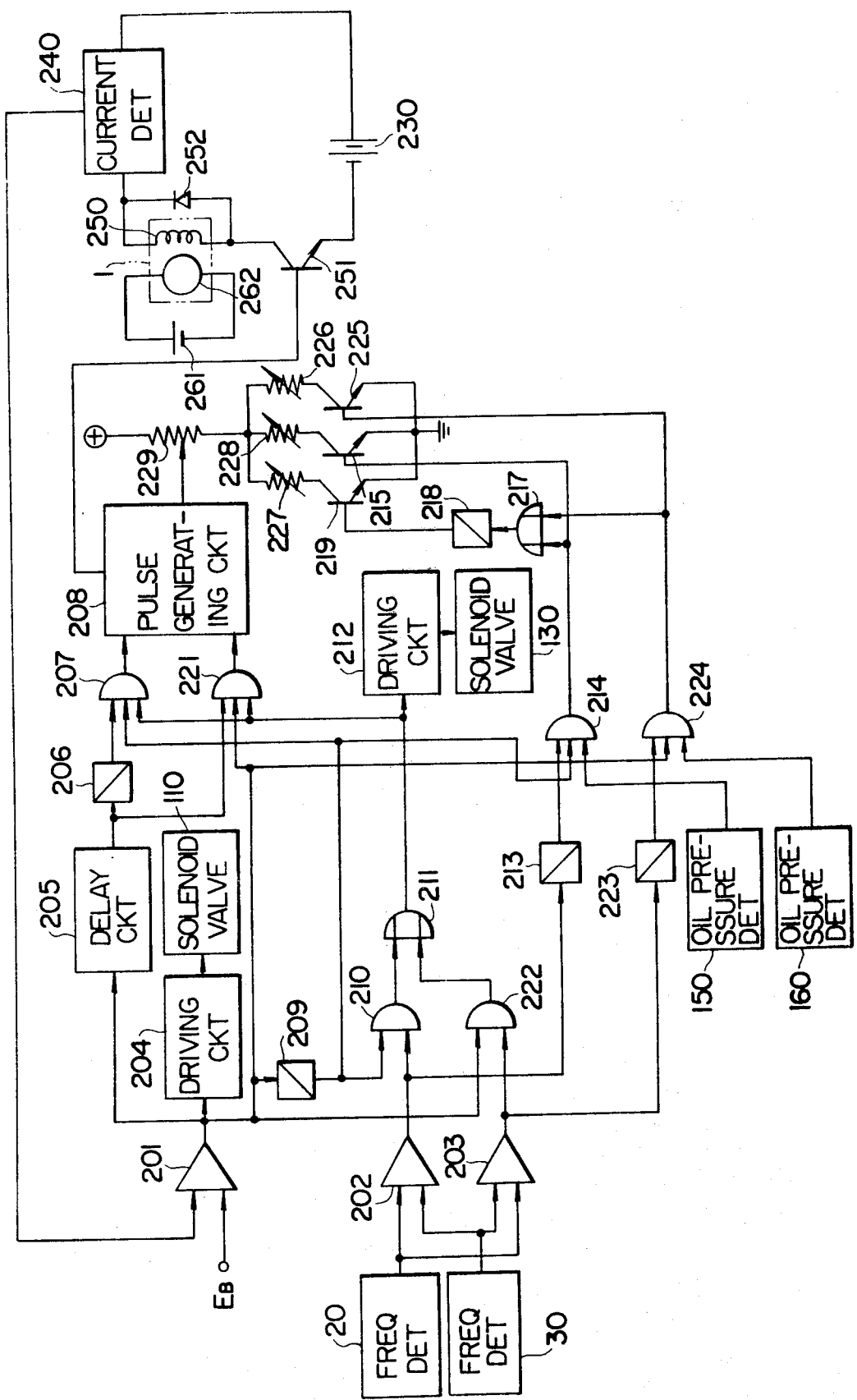
FIG. 3 is a circuit diagram showing an electrical control circuit in the speed change controlling device according to the present invention.

A discussion now will be made of the electric control circuitry for energizing or de-energizing the solenoid valves 110 and 130 described above with reference to FIG. 3. The electric automobile driving motor 1 is of a DC shunt type comprising an armature 262 connected to a DC source 261, a field coil 250 connected in series to a transistor 251 and a DC source 230, a fly wheel diode 252 connected in parallel to the field coil 250, and a current detector 240 for detecting the field current and converting it into an analog signal. A comparison circuit 201 is provided whereby the signal corresponding to the field current from the current detector 240 is compared with a preset reference voltage signal $E_B$. If the former signal is greater than the latter signal $E_B$, a logic "1" signal is generated, but if the reverse is true, a logic "0" signal is generated.

The output side of the comparison circuit is connected to solenoid valve 110 via a driving circuit 204. The rotational frequency detectors 20 and 30 shown in FIG. 1 are connected to comparison circuits 202 and 203, with one of the comparison circuits 202 being connected to an AND circuit 210 which is also connected at its output side to comparison circuit 201 via NOT circuit 209, while the other comparison circuit 203 is connected to another AND circuit 222 which is connected at its input side directly to comparison circuit 201. These AND circuits 210 and 222 are connected to solenoid valve 130 via OR circuit 211 and driving circuit 212.

The comparison circuit 202 gives out a logic 1 signal when the voltage signal $E_M$ corresponding to the input shaft speed and the voltage signal $E_O$ corresponding to the output shaft speed have the relationship of $E_M > E_O$ and gives out a logic 0 signal when such relationship is $E_M \leq E_O$. On the other hand, comparison circuit 203 gives out a 1 signal when the voltage signals $E_M$ and $E_O$ and the gear ratio P produced by the planetary gearing 17 in the first speed has the relationship of $E_M < P E_O$, and gives out a 0 signal when such relationship is $E_M \geq P E_O$.

The output side of comparison circuit 201 is further connected to AND circuit 207 through delay circuit 205, which produces a time lag of $t_a$ (see FIGS. 5a and 6a) according to the charging or discharging of a capacitor incorporated therein, and further through NOT circuit 206. The output sides of NOT circuit 209 and OR circuit 211 are connected to the AND circuit 207 to provide the "and" of these three circuits. The output side of delay circuit 205 is further connected to AND circuit 221, and to this AND circuit 221 are connected the output sides of comparison circuit 201 and OR circuit 211 to provide the "and" of these three circuits.

The AND circuits 207 and 221 are connected to the base of transistor 251 through a pulse generating circuit 208, and when a 1 signal is emitted from one of the AND circuits 207, the transistor 251 is kept conductive to increase the field current, while when a 1 signal is issued from the other AND circuit 221, the transistor 251 is made non-conductive to decrease the field current. The pulse generating circuit 208 is connected in series through variable resistor 229 to three variable resistors 226 to 228 and switch-operated transistors 215, 219 and 225. When the transistor 219, 215 or 225 becomes conductive separately from each other, the pulse width is determined by the value of resistance of the resistors 227 and 229, or 228 and 229, or 226 and 229, to vary the rate of conducting time to interrupting time of the transistor 251 in three steps in order to change the field current. Thus, transistor 219 stays conductive during the normal running state of the first or second speed while one of the transistors 215 or 225 becomes temporarily conductive during speed change control.

Comparison circuits 202 and 203 are further connected at their output side to AND circuits 214 and 224 via NOT circuits 213 and 223, respectively. The AND circuits 214 and 224 are further connected at their input side to oil pressure detector means 150 and 160, shown in FIG. 2, adapted to detect oil pressure acting on clutches 5 and 7, and give out a 1 signal when the oil pressure is not high enough to perform the engaging action. The AND circuits 224 and 214 are also connected to the input side and output side, respectively, of NOT circuit 209. It will also be seen that the output sides of the AND circuits 214 and 224 are connected to the bases of transistors 215 and 225 and to the base of transistor 219 through OR circuit 217 and NOT circuit 218, respectively.

It is here pertinent to consider the speed changing point in case an automatic speed change control is used, reference being made to FIG. 4. In the first speed condition, the field current is increased as shown by the dotted lines and solenoid valve 110 is energized by a 1 output signal from comparison circuit 201, and as its value is decreased successively from $a$ to $b$ and then to $c$, torque is decreased to increase the output shaft speed. In the case of $c$, the value becomes equal to the reference voltage signal $E_B$ of comparison circuit 201 so that the output of comparison circuit 201 is made zero to de-energize solenoid valve 110 to thereby effect shift-up to the second speed. In the second speed condition, the field current is decreased as shown by the solid lines to make solenoid valve 110 non-conductive, and its value is gradually raised up from $f$ to $e$ to $d$. While the output shaft speed is lowered with rise of torque, in the case of $d$ a 1 signal is generated from comparison circuit 201 to energize solenoid valve 110 to thereby effect shift-down to the first speed. In this way, the speed changing point is determined by the field current to accomplish the required speed change automatically, but actually such speed changing point is slightly varied due to a cause associated with torque during the speed changing operation, so that it is desirable to accomplish speed change when the number of revolutions of the output shaft is between $N_1$ and $N_2$ in the case of shift-up and between $N_1'$ and $N_2'$ in the case of shift-down.

Discussion is now directed to the controlling operations in the speed changing process while referring to FIGS. 5a–d and 6a–d. In FIGS. 5b and 6b, $n_M$ and $n_O$ indicate the number of revolutions of motor 1 and the number of revolutions of output shaft 13, respectively, which are equal to the number of revolutions of input shaft 2. $P_1$ and $P_2$ in FIGS. 5c and 6c signify oil pressures acting on first clutch 7 and direct clutch 5, respectively, while $I_1$ and $I_2$ in FIGS. 5d and 6d represent the energized conditions of solenoid valves 110 and 130, respectively.

In the case of the first speed, a 1 signal is emitted from comparison circuit 201 to energize solenoid valve 110, and as the input shaft speed is higher than the output shaft speed, a 1 signal is also provided by comparison circuit 202 and fed to AND circuit 210, but since the 1 signal from comparison circuit 201 is reversed in NOT circuit 209, the output signal in AND circuit 210 becomes zero. On the other hand, a 1 signal from comparison circuit 201 is conducted into AND circuit 222, too, but as the output signal in comparison circuit 203 is zero, the output signal in AND circuit 222 also becomes zero, so that no signal is provided by OR circuit 211 to de-energize solenoid valve 130. Also, as the 1 signal from comparison circuit 201 is reversed in NOT circuit 206, the output signal in AND circuit 207 becomes zero and since the output signal in OR circuit 211 is also zero, the output signal in AND circuit 221 is made zero, too. Further, since no signal is provided by the oil pressure detector means owing to the action of first clutch 7, the output signal of AND circuit 214 becomes zero, and as a 1 signal from comparison circuit 202 is reversed in NOT circuit 213, the output signal of AND circuit 214 also becomes zero to render transistors 215 and 225 non-conductive. However, a 1 signal is emitted from NOT circuit 218 by reversion to make transistor 219 conductive and, consequently, transistor 251 is made conductive by the ON-OFF ratio of variable resistors 229 and 227 to thereby determine the field current.

In this way, when speed change is made from the first to second speed at $t_0$, the output signal of comparison circuit 201 is turned from 1 to 0 with a decrease of field current to de-energize solenoid valve 110 and at the same time a 1 signal reversed in NOT circuit 209 enters AND circuit 210. However, during the period immediately after $t_0$, the input shaft speed is still higher than the output shaft speed and a 1 signal continues to be fed from comparison circuit 202, so that the output signal of AND circuit 210 becomes 1. Solenoid valve 130 thus is energized and temporarily keeps a neutral state as shown in (d) of FIG. 5. Then, when the time proceeds from $t_0$ to $t_1$ with a time delay of $t_a$, oil pressure to the released first clutch 7 is completely discharged and the output of delay circuit 205 is turned from 1 to 0 as shown in (c) of FIG. 5 and this signal is reversed in NOT circuit 206 and led into AND circuit 207. As the other input signal also becomes 1, AND circuit 207 generates a 1 signal and therefore transistor 251 is not chopped but kept conductive by pulse generating circuit 208. Consequently, the field current is sharply increased as shown in (a) of FIG. 5 to decrease the motor speed as shown in FIG. 5b, and as the time proceeds slightly from $t_1$ to $t_2$, the input shaft speed equal to the motor speed becomes equal to the output shaft speed, whereupon the output signal of comparison circuit 202 becomes zero as does the output signal from OR circuit 211 to de-energize solenoid valve 130. Thus, the neutral condition is broken off to supply pressurized oil to direct clutch 5, thereby substantially commencing shift-up to the second speed. At this time, no signal is generated either from OR circuit 211 or from AND circuit 207 but instead a 1 signal is fed from AND circuit 214 to make transistor 251 conductive, so that pulse generating circuit 208 slightly decreases the field current by variable resistors 229 and 228 as shown in FIG. 5a. This field current keeps the motor speed and the output shaft speed equal to each other as shown in FIG. 5b. And when oil pressure of direct clutch 5, to which oil is being supplied, is raised up and reaches $P_o$, where perfect engagement is possible, at $t_3$ as seen in FIG. 5c, the output of oil pressure detector means 150 becomes zero. Consequently, the output signal of AND circuit 214 also becomes zero to render transistor 215 non-conductive while making transistor 219 again conductive, with the result that the field current is turned back to the normal running range by variable resistors 229 and 219.

When speed is changed from the second to first speed, then the output signal of comparison circuit 201 is turned from 0 to 1 to energize solenoid valve 110, but immediately after such speed change, the input shaft speed and the output shaft speed still remain equal to each other so that a 1 signal is provided by comparison circuit 203. Hence, the output signal of AND circuit 222 also is made 1, so that as solenoid valve 130 is energized as shown in (d) of FIG. 6, the transmission is temporarily brought into the neutral position in the same way as described above. Then, when the time gets to $t_1$, with the time delay of $t_a$, the output signal of delay circuit 205 is changed from 0 to 1 and now a 1 signal is fed from AND circuit 221 and transistor 251 is rendered non-conductive by pulse generating circuit 208, so that the field current is sharply decreased as shown in (a) of FIG. 6 to increase the motor speed in the manner shown in FIG. 6 b.

When the motor speed becomes equal to the product of the output shaft speed and gear ratio at the time $t_2'$, the output signal of AND circuit 222 as well as that of comparison circuit 203 becomes zero to de-energize solenoid valve 130, whereby the neutral condition is broken off to start providing a supply of pressurized oil to first clutch 7. At this time no signal is provided either by OR circuit 211 or AND circuit 221 and, instead, a 1 signal is emitted from AND circuit 224 to render transistor 225 conductive, so that pulse generating circuit 208 slightly increases the field current as in FIG. 6a by the action of variable resistors 229 and 226 to maintain a synchronized condition where the motor speed is equal to the product of the output shaft speed and gear ratio as shown in FIG. 6b. And when oil pressure of first clutch 7 reaches $P_o$ of the engageable situation at $t_3'$, the output of oil pressure detector means 160 becomes zero to render transistor 225 non-conductive and transistor 219 conductive to turn the field current back into the normal running range. Here, although the field current is either increased or decreased during the period when the transmission is kept in the neutral condition, such period is very short, and ample time delay is furnished, so that comparison circuit 201 won't be actuated.

It is essential that clutch 5 or 7 be perfectly disengaged during the period delay time. If $t_a$ is too small, the motor speed may be changed when clutch 5 or 7 is partly engaged, causing a sharp impulsive torque, while if $t_a$ is too large, although no problem of impulsive torque arises, the speed changing time is elongated and/or the motor speed is decreased excessively. Therefore, the setting of $t_a$ within the optimum time range is essential.

Thus, according to the present invention, as is apparent from the foregoing explanation, when a speed change is performed automatically from a low speed range to a higher speed range, or vice versa, the transmission is temporarily kept in the neutral position, and during this period pressure is perfectly discharged from the released clutch 5 or 7. Also, the motor rotation is synchronized with rotation of the output shaft, and further such synchronized relation is maintained until oil supply to the engaged clutch 7 or 5 is completed, so that the desired speed change can be accomplished very smoothly with substantially no impulsive torque produced. Further, since the hydraulic signal of clutch 5 or 7 is utilized for the speed change control signal, the speed changing operations are very positive and reliable and oil pressure control can be accomplished with good timing. In the case of obtaining the first speed by using the one-way clutch 9, the engaging and disengaging operations of first clutch 7 are unnecessary and hence speed change control is even more simplified. It will be also apparent that the principles of the present invention can be similarly applied for effecting speed change involving more than three different speed ranges.

What is claimed is:

1. A speed change control device in an automatic transmission for electric automobiles having a speed change gear mechanism connected directly to a vehicle driving motor, comprising: a hydraulic engaging means for accomplishing speed change meshing of said gear mechanism; valve means actuated to make a change-over operation by a speed change signal to supply operating oil pressure to said hydraulic engaging means; a speed change signal producing means to produce and commute a speed change signal to said valve means in response to the vehicle running condition; a neutral setting means to temporarily release said hydraulic engaging means by said valve means at the time of speed change to bring said automatic transmission into a neutral position; a motor speed control means to vary the rotational frequency of said motor during the period of the neutral position and to synchronize the rotational frequency of the motor with the rotational frequency of an output shaft of said automatic transmission; and means for maintaining synchronization of the rotational frequencies of said motor and said output shaft until oil pressure, sufficient for full meshing of said gear mechanism, is supplied to said hydraulic engaging means; wherein said motor speed control means includes means for comparing the rotational speed of said motor with that of the output shaft of said automatic transmission and varying field current of said motor in accordance with the difference between the rotational speeds of said motor and output shaft in consideration of the speed change ratio of said speed change gear mechanism, and chopper means for controlling the field current of said motor, said chopper means upon shift-down being kept turned-off so as to rapidly increase the rotational speed of said motor while said chopper means upon shift-up remains turned-on so as to rapidly decrease the rotational speed of said motor.

2. A speed change control device as claimed in claim 1, wherein said synchronization maintaining means comprises means for detecting the oil pressure supplied to said hydraulic engaging means, said detecting means, upon overshooting due to the rapid increase or decrease of the motor speed during rising of the oil pressure supplied to said hydraulic engaging means, changing current flow through said chopper means thereby opposing the overshooting whereby the synchronization is maintained.

3. A speed change control device as claimed in claim 1, wherein said motor speed control means is responsive to said speed change signal and comprises means for providing a predetermined time delay for said speed change signal to cause the synchronization to be effected.

* * * * *